(12) United States Patent
Cheng (10) Patent No.: US 8,382,950 B2
(45) Date of Patent: Feb. 26, 2013

(54) RECYCLING OF WASTE COATING COLOR

(75) Inventor: Weiguo Cheng, Naperville, IL (US)

(73) Assignee: Nalco Company, Naperville, IL (US)

( * ) Notice: Subject to any disclaimer, the term of this patent is extended or adjusted under 35 U.S.C. 154(b) by 195 days.

(21) Appl. No.: 12/975,596

(22) Filed: Dec. 22, 2010

(65) Prior Publication Data

US 2011/0088861 A1 Apr. 21, 2011

Related U.S. Application Data (63) Continuation-in-part of application No. 11/854,044, filed on Sep. 12, 2007, now Pat. No. 8,172,983.

(51) Int. Cl.
*D21H 17/67* (2006.01)
*D21H 17/69* (2006.01)
*D21H 21/14* (2006.01)

(52) U.S. Cl. ............ 162/169; 162/158; 162/168.1; 162/175; 162/181.2; 162/181.8; 162/185; 162/189; 162/191; 106/464; 106/465; 106/468; 106/471

(58) Field of Classification Search .......... 162/158, 162/164.1, 168.1–170, 175–178, 181.1–181.8, 162/189, 191, 185; 106/400, 401, 461–468, 106/471

See application file for complete search history.

(56) References Cited

U.S. PATENT DOCUMENTS

| 4,181,567 A | 1/1980 | Riddell et al. |
| 4,799,964 A | 1/1989 | Harvey et al. |
| 4,889,594 A | 12/1989 | Gavelin |
| 4,943,349 A | 7/1990 | Gomez |
| 5,017,268 A | 5/1991 | Clitherow et al. |
| 5,185,135 A | 2/1993 | Pillai et al. |
| 5,830,364 A | 11/1998 | Bleakley |
| 6,159,381 A | 12/2000 | Bleakley et al. |
| 6,214,166 B1 | 4/2001 | Munchow |
| 6,524,439 B2 | 2/2003 | Chen et al. |
| 7,097,346 B2 * | 8/2006 | Bergman ............... 366/152.3 |
| 7,638,017 B2 * | 12/2009 | Gane et al. ............. 162/181.2 |
| 7,842,165 B2 | 11/2010 | Shevchenko et al. |

FOREIGN PATENT DOCUMENTS

EP 1734174 A2 * 5/2006

OTHER PUBLICATIONS

Bobu, E., "Preflocculated Calcium Carbonate for Filling Paper." *Cell. Chem. Technol.*, vol. 20, No. 5 (1986). pp. 559-566.
Ono, H. "Cationic Microparticle Retention Aids: Mechanism Study and Laboratory Evaluation". *IPST: Technical Paper Series*. 632 (Atlanta, GA) p. 20, 1997.

(Continued)

*Primary Examiner* — Dennis Cordray
(74) *Attorney, Agent, or Firm* — Benjamin E. Carlsen; Andrew D. Sorensen (57) ABSTRACT

The invention provides a method of recovering and recycling waste coating color from papermaking coating process for use as wet end filler. The inventive method overcomes many technical challenges inherent in using waste coating colors as wet end filler such as the coatings having fine pigments that hurts sheet strength more than regular filler, having strong anionic charge and tendency to disturb wet end chemistry, causing excessive foaming, and containing a large amount of hydrophobic binder particles that tend to agglomerate in the white water and deposit on papermaking equipment. The method involves mixing the coatings with fresh filler particles, adding de-foaming agent, adding cationic coagulant, then preflocculating the mixture. This process causes fresh filler particles, pigments and binders in waste coating color to agglomerate together and form stable flocs with defined particle size distribution. Moreover, using such agglomerate as wet end filler was found to improve sheet strength properties by taking advantage of the binding ability of the latex or binders contained in the waste coating color.

12 Claims, 7 Drawing Sheets

OTHER PUBLICATIONS

Petzold, G., "Higher efficiency in the flocculation of clay suspensions by using combinations of oppositely charged polyelectrolytes." *Colloids and Surfaces*, vol. 218 (2003), pp. 47-57.

Yoon, S. and Deng, Y. "Flocculation and reflocculation of clay suspension by different polymer systems under turbulent conditions," *Colloids and Interface Science*. vol. 278 (2004), pp. 139-145.

\* cited by examiner

FIGURE 1

| PCC Type | Basis Weight gsm | Ash Content % | Bulk cm³/g | Opacity (%, ISO) | Brightness (%, ISO) | Kajaani Formation Index | Roughness (μm) | HST (s) | ZDT (Kpa) | Tensile Index (N.m/g) |
|---|---|---|---|---|---|---|---|---|---|---|
| Prefloc blend | 79.7 | 14.2 | 1.83 | 87.7 | 89.1 | 107.3 | 6.3 | 297.9 | 519.3 | 43.9 |
| Prefloc blend | 77.0 | 19.6 | 1.83 | 89.0 | 89.5 | 105.0 | 6.2 | 205.8 | 504.7 | 39.4 |
| Prefloc blend | 75.1 | 25.4 | 1.83 | 90.1 | 90.0 | 104.9 | 6.0 | 107.2 | 466.8 | 33.4 |
| Untreated Blend | 79.8 | 14.8 | 1.88 | 88.6 | 89.6 | 108.0 | 6.3 | 438.3 | 487.2 | 37.1 |
| Untreated Blend | 78.2 | 19.9 | 1.88 | 89.7 | 89.9 | 110.0 | 6.3 | 343.4 | 481.8 | 33.5 |
| Untreated Blend | 77.4 | 27.3 | 1.89 | 91.0 | 90.4 | 104.6 | 6.1 | 252.6 | 415.7 | 27.7 |
| Untreated PCC | 79.9 | 14.9 | 1.92 | 88.7 | 89.7 | 107.3 | 6.3 | 304.8 | 484.4 | 36.3 |
| Untreated PCC | 78.3 | 20.8 | 1.95 | 89.8 | 90.1 | 104.6 | 6.1 | 256.4 | 434.9 | 31.1 |
| Untreated PCC | 77.8 | 26.1 | 1.95 | 90.8 | 90.6 | 100.1 | 6.0 | 43.7 | 374.7 | 25.0 |

RECYCLING OF WASTE COATING COLOR

CROSS-REFERENCE TO RELATED APPLICATIONS

This Application is a Continuation in Part of U.S. patent application Ser. No. 11/854,044 filed on Sep. 12, 2007 now U.S. Pat. No. 8,172,983.

STATEMENT REGARDING FEDERALLY SPONSORED RESEARCH OR DEVELOPMENT

Not Applicable.

BACKGROUND OF THE INVENTION

This invention relates to methods and compositions useful in the treatment and recycling of waste coating color that is generated in paper coating processes. Coatings are commonly used during the papermaking process to improve the optical and printing properties of the resulting paper. Coating colors or formulations commonly include pigments, binders, and other minor additives. Pigments can represent as much as 95% of the solids in the coating formulation and contain calcium carbonate, kaolin clay, titania, talc, plastic pigments, silica, alumina, or mixtures thereof. Binders typically represent from 5% to 25% of the solids in the coating formulation and are natural or synthetic polymers that bridge the pigment particles in the coating to give the coating cohesive strength and flexibility. The most typical natural binder is starch, while typical synthetic binders are styrene-butadiene copolymers, styrene-acrylate copolymers, polyvinyl alcohol, and polyvinyl acetate. Minor additives usually make up about 1% of the solids in the coating formulation and consist of a variety of chemicals that serve many purposes in the coating. Possible additives are insolubilizers, optical brighteners, dispersants, lubricants, defoamers, rheology modifiers, dyes, and microbiocides. The coating forms a layer on the outside of the sheet of paper. This improves its opacity, brightness, smoothness, and print quality compared to an uncoated sheet.

Unfortunately, significant amounts of waste coating color are generated in typical paper coating processes. This waste is a result of coating that has been added to the process but which for one reason or another does not end up coating the paper surface. In some cases this waste can be as much as 4% of the total applied coating. Common practice is to dewater and compact this waste coating and to simply dump it into landfills or burn it. Many mills use hundreds of thousands, if not millions of tons of coating, resulting in tens of thousands of tons of waste being generated annually. This results in both terrible environmental costs as well as a significant waste of economic resources. Thus there is clear need and novel utility in a method of recycling coating waste generated in a papermaking process. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method of incorporating waste coating in a paper sheet of a papermaking process. The method comprises the steps of: 1) providing a furnish comprising at least cellulose fibers and water, filler particles, and waste coating from a previous papermaking coating process, 2) mixing the waste coating and the fresh filler particles to form a mixture, 3) optionally adding a defoamer to the mixture, 4) adding a cationic agent to the mixture, 5) adding a first flocculating agent to the mixture in an amount sufficient to mix uniformly without causing significant flocculation of the filler and coating waste, the first flocculating agent being a flocculant; 6) adding a second flocculating agent to the mixture after adding the first flocculating agent, in an amount sufficient to initiate flocculation of the filler and coating waste in the presence of the first flocculating agent, the second flocculating agent being of opposite charge to the first flocculating agent, the flocculated mixture of fresh filler and coating waste defining a filler material, 7) optionally, shearing the flocculated mixture of fresh filler and coating waste to provide flocs having the desired particle size, and 8) mixing the filler material within the furnish.

The waste coating may comprise water and water may be a majority of the mass of the waste coating. The coating waste may comprise at least one pigment from the list consisting of: precipitated calcium carbonate, ground calcium carbonate, kaolin clay, titanium dioxide, plastic pigments, and any combination thereof. The coating waste may comprise at least one binder from the list consisting of: starch, styrene-butadiene resin, styrene-acrylate copolymer, styrene-acrylic acid resin, and any combination thereof. The cationic agent may be one selected from the list consisting of: a starch, a flocculant, a coagulant, and any combination thereof. The first flocculating agent may be selected from the group consisting of cationic, anionic, nonionic, zwitterionic and amphoteric polymers. The second flocculating agent may be selected from the group consisting of microparticles, coagulants and cationic, anionic, nonionic, zwitterionic and amphoteric polymers and mixtures thereof. The second flocculating agent and first flocculating agent may be oppositely charged. The first flocculating agent may be anionic and the second flocculating agent may be cationic. The preflocculated mixture of coating waste and fresh filler may have a median particle size of 10-70 μm. Substantially 100% of the coating pigments and binders may be flocculated with the filler material. The solids content of the coating waste may be between 0.5% and 10%. The relative amounts of filler particles and coating particles are between 50 to 98% filler particles and 2% to 50% waste coating particles.

At least one embodiment of the invention is directed towards a sheet of paper manufactured in a papermaking process according to the above method.

BRIEF DESCRIPTION OF THE DRAWINGS

A detailed description of the invention is hereafter described with specific reference being made to the drawings in which.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

For purposes of this application the definition of these terms is as follows:

"Binder" means natural or synthetic polymers that bridge the pigment particles in the coating to give the coating cohesive strength and flexibility.

"Coating, coating formulation, or coating color" means a mixture of water, pigments, binders, and other minor additives.

"Coagulant" means a composition of matter having a higher charge density and lower molecular weight than a flocculant, which when added to a liquid containing finely divided suspended particles, destabilizes and aggregates the solids through the mechanism of ionic charge neutralization.

"Defoamer" means a material added to a coating color or to the papermaking process that reduces the generation of foam and/or the persistence of foam. Defoamers are usually blends of any or all of the following components: organic or inorganic hydrophobic particulates, spreading agents, and surfactants in oil or a water carrier. Specific chemicals often used in defoamer formulations are silica particles, hydrophobically-modified silica particles, polyethylene glycol (PEG) esters and amides, fatty acids, fatty amides, fatty alcohols, and alkoxylated nonionic surfactants.

"Filler" means a material which as a result of the papermaking process becomes positioned within the resulting paper for the purposes of reducing the cost by replacing more expensive fiber components, Filler often increase the opacity, increase the brightness, and/or increase the smoothness of the resulting paper.

"Flocculant" means a composition of matter having a low charge density and a high molecular weight (in excess of 1,000,000) which when added to a liquid containing finely divided suspended particles, destabilizes and aggregates the solids through the mechanism of interparticle bridging.

"Flocculating Agent" means a composition of matter which when added to a liquid destabilizes and aggregates colloidal and finely divided suspended particles in the liquid; flocculants and coagulants can be flocculating agents.

"GCC" means ground calcium carbonate, which is manufactured by grinding naturally occurring calcium carbonate rock.

"PCC" means precipitated calcium carbonate which is synthetically produced.

"Pigment" means a solid, particulate material that makes up as much as 95% of a coating formulation, which as a result of the papermaking process, becomes engaged to the outside of the resulting paper for the purpose of improving the optical and printing properties of the resulting paper.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

Numerous materials are commonly used as pigments, binders, and fillers. Pigments can represent as much as 95% of the solids in the coating formulation and are often calcium carbonate, kaolin clay, titania, talc, plastic pigments, silica, alumina, or mixtures thereof. Calcium carbonate, for example, can be used as a pigment or filler. In prior art applications, fillers (such as calcium carbonate) are particles typically from 1 to 8 microns in size. This size often represents a compromise with fine particles scattering light more efficiently and large particles interfering less with the strength of the paper. Pigment particles used in coatings tend to be smaller than fillers, with as much as 95% by mass smaller than 2 microns. Binders typically represent from 5% to 25% of the solids in the coating formulation and are natural or synthetic polymers that bridge the pigment particles in the coating to give the coating cohesive strength and flexibility. The most typical natural binder is starch, while typical synthetic binders include styrene-butadiene copolymers, styrene-acrylate copolymers, polyvinyl alcohol, and polyvinyl acetate. Minor additives usually make up about 1% of the solids in the coating formulation and consist of a variety of chemicals that serve many purposes in the coating. Possible additives are insolubilizers, optical brighteners, dispersants, lubricants, defoamers, rheology modifiers, dyes, and microbiocides. Coating formulations usually contain 20% to 50% water by mass. Most of this water must be removed in the coating process through absorption into the paper structure and radiant drying. The coating forms a layer on the outside of the sheet of paper. This improves its opacity, brightness, smoothness, and print quality compared to an uncoated sheet.

Numerous technical problems discourage the reuse of waste coatings as either fillers or coatings. After a paper coating process, the waste coatings are present as dilutions in varying amounts of wash water. Waste coatings are poor candidates for fillers because they have a high foaming tendency, are strongly anionic and difficult to retain in the papermaking web, and contain a large amount of hydrophobic binder particles that tend to agglomerate in the white water and deposit on papermaking equipment. Additionally, they have a small size and tend to weaken the paper significantly. They are poor candidates for coatings because of their low and inconsistent concentration. This results in inconsistent rheology leading to poor coater runnability and poor coating quality. U.S. Pat. Nos. 5,830,364, 6,159,381, and 6,214,166 describe attempts to recover one or more portions of the waste coating from a papermaking process, but do not adequately address the problems inherent in waste coatings and do not teach a cost effective recovery process.

In at least one embodiment waste coatings are used as filler in a papermaking process. This is accomplished by mixing the waste coating with fresh filler and treating the mixture to negate the various technical problems. In at least one embodiment the mixture comprises between 50 to 98% fresh properly sized filler particles and 2% to 50% smaller waste coating solids.

In at least one embodiment the treatment comprises adding a defoaming agent to the mixture, adding a cationic coagulant to the mixture, and preflocculating the mixture. When preflocculated, the mixed waste coating and fresh filler particles are agglomerated through treatment with coagulants and/or flocculants.

In at least one embodiment, at least some of the coating is binder and the preflocculation results in the agglomeration containing substantially all of the latex that was present in the coating waste. This results in turning waste latex from a liability to an asset. As a material which is highly hydrophobic by nature, waste latex can agglomerate from dilute solutions and ultimately deposits on papermaking equipment, resulting in low papermaking efficiency and quality problems with the finished paper. In this case however, because all of the latex is incorporated within the agglomerates, the process equipment is not clogged and the latex instead further enhances the strength properties of the paper by helping bind mineral particles to each other and to paper fibers.

In at least one embodiment the treatment comprises adding a defoaming agent to the mixture, adding a cationic coagulant to the mixture, and combining the mixture with at least one item selected form the list consisting of starch, coagulant, flocculant, and any combination thereof.

In at least one embodiment the preflocculation process comprises the steps of:
 a) providing an aqueous dispersion of filler and coating waste;
 b) adding a first flocculating agent to the dispersion in an amount sufficient to mix uniformly in the dispersion without causing significant flocculation of the filler and coating particles, the first flocculating agent being a flocculant;
 c) adding a second flocculating agent to the dispersion after adding the first flocculating agent, in an amount sufficient to initiate flocculation of the filler and coating particles in the presence of the first flocculating agent, the second flocculating agent being of opposite charge to the first flocculating agent; and
 d) optionally, shearing the flocculated dispersion to provide a dispersion of filler-coating waste flocs having the desired particle size.

In at least one embodiment the preflocculation process comprises the steps of:
 a) providing an aqueous slurry of anionically dispersed coating waste and undispersed or dispersed filler particles;
 b) adding a low molecular weight composition to the dispersion, the added low molecular weight composition at least partially neutralizing the charge in the dispersion;
 c) adding a first flocculating agent to the dispersion under conditions of high mixing, the first flocculating agent being a flocculant;
 d) adding a second flocculating agent to the dispersion under conditions of high mixing, the second flocculating agent comprising an item selected from the list consisting of: a flocculent, a coagulant, a microparticle, and any combination thereof; and
 e) optionally, shearing the flocculated dispersion to provide a dispersion of filler and coating flocs having the desired particle size.

EXAMPLES

The following examples are presented to describe embodiments and utilities of the invention and are not meant to limit the invention unless otherwise stated in the claims.

Example 1

Figure 1:
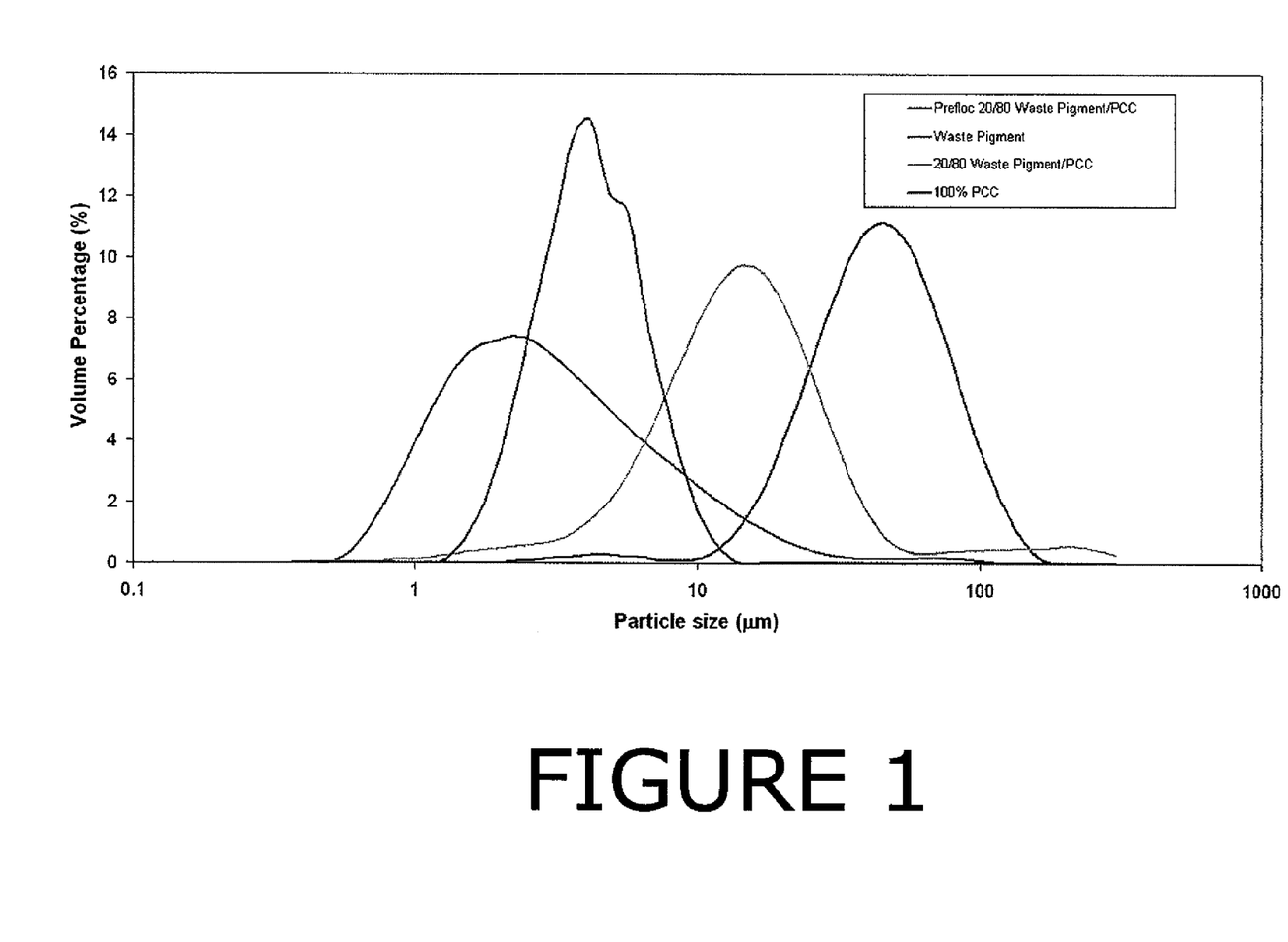
FIG. 1 is a graph showing the particle size distribution of waste coating used in the invention.
Figure 2:
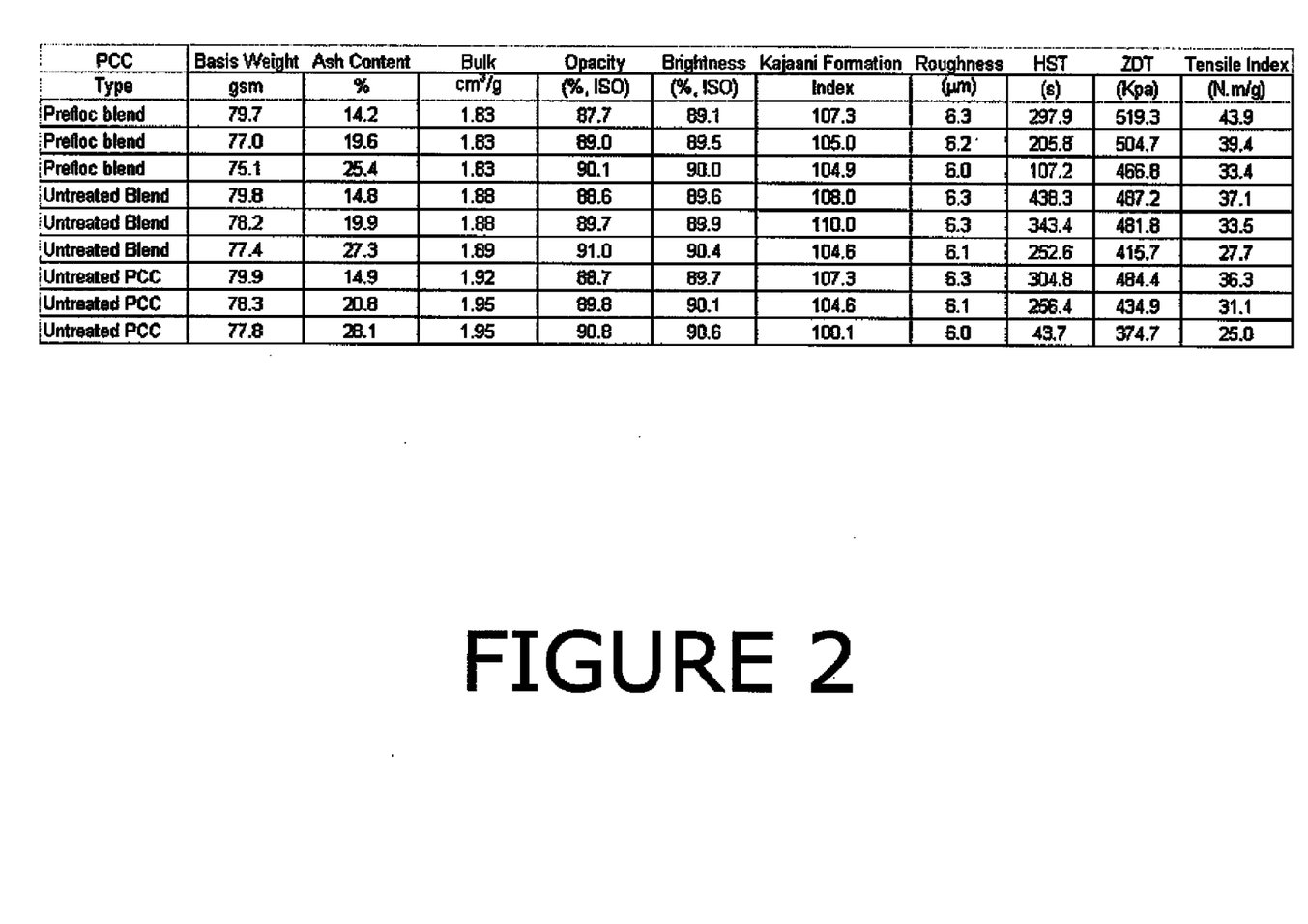
FIG. 2 is a table of the physical properties of paper made according to the invention.

A waste coating color sample was obtained from a paper mill. The solids level of the waste coating color was 5.76%. A fresh filler with 18% solids was also obtained from the same mill, and it was Albacar LO, manufactured by Specialty Minerals Inc. (SMI). The waste coating color was then mixed with fresh filler in a mass ratio of 20/80. Tap water was added to the mixture to make the solids content 10%. 300 ml of the mixture was stirred at 800 rpm. A significant amount of foam was generated by the stirring. Enough silicone-based defoaming agent was added to eliminate the foam. 5.5 lb/ton of Nalco coagulant DEV120 was added slowly into the mixture, followed by 5 lb/ton Nalco flocculating agent DEV115. Then 3.0 lb/ton Nalco flocculating agent DEV125 was slowly added into the mixture. All the chemical dosages were based on product mass per ton of solids in the coating waste/filler mixture. The dosages of the coagulant and flocculating agents were carefully chosen to minimize foaming. After the addition of flocculating agent DEV125, the mixture was stirred at 1500 rpm for 2 minutes. FIG. 1 shows the particle size distributions of waste coating color only, fresh filler only, the mixture of waste coating color and fresh filler, and the treated mixture. After treatment, the particle size was significantly larger, which is believed to be beneficial for improving sheet strength. Coagulant DEV120 is a cationic poly(diallyldimethylammonium chloride) with a RSV of about 0.7 dL/g, available from Nalco Company, Naperville, Ill., USA. Flocculating agent DEV115 is an anionic sodium acrylate-acrylamide copolymer with an RSV of about 32 dL/g and a charge content of 29 mole percent, available from Nalco Company, Naperville, Ill., USA. Flocculating agent DEV125 is a cationic acrylamide-dimethylaminoethyl acrylate-methyl chloride quaternary salt copolymer with an RSV of about 25 dL/g and a charge content of 10 mole percent, available from Nalco Company, Naperville, Ill., USA.

Examples 2, 3 and 4 were performed to demonstrate that binders contained in the waste coating color were deposited onto the pigment or filler surfaces after the treatment.

Example 2

Figure 3:
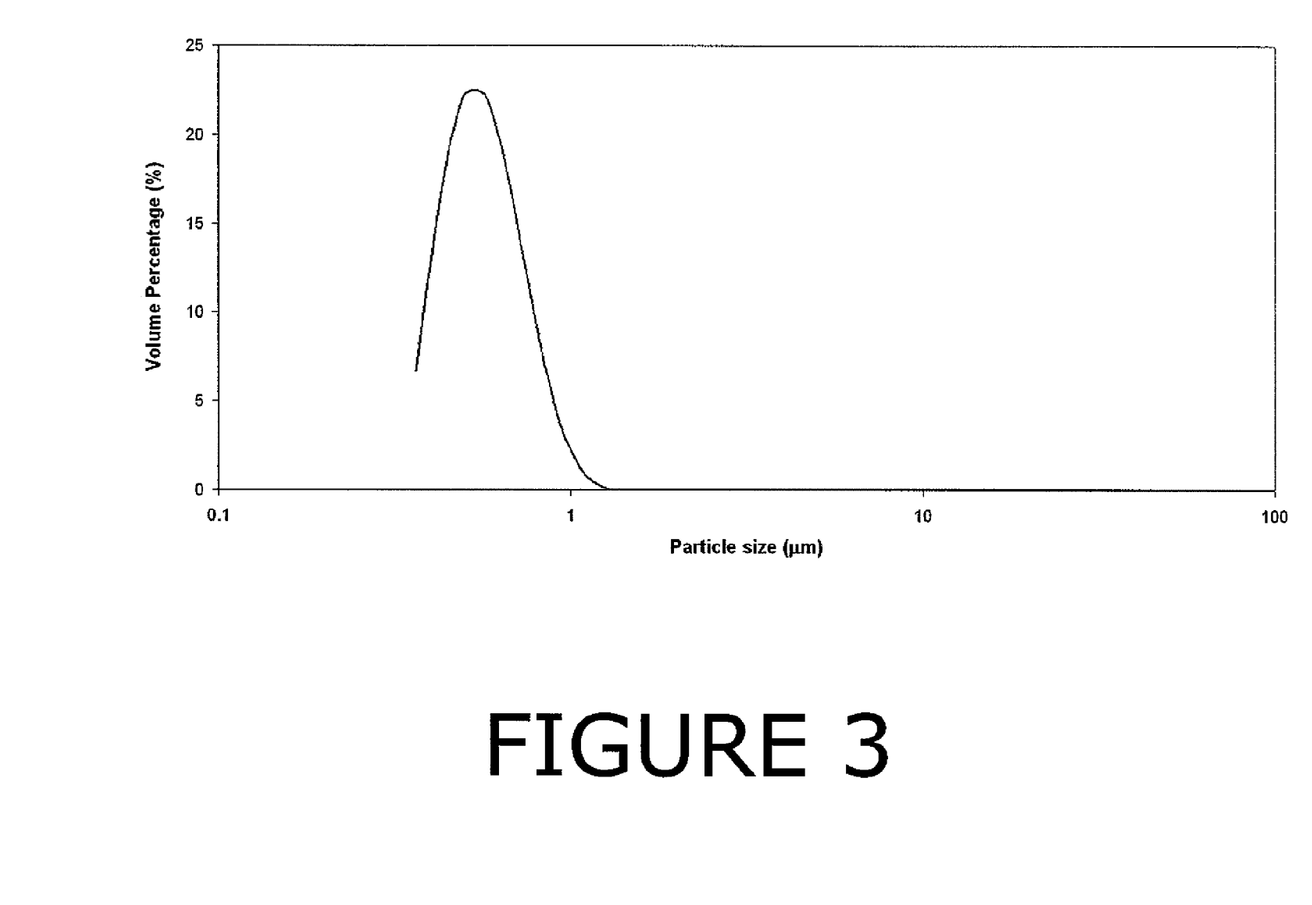
FIG. 3 is a graph showing the particles contained in the supernatant of the untreated mixture.

Samples of 20/80 mixture of waste coating color and fresh filler before and after the treatment described in Example 1 were centrifuged at 1500 rpm for 15 minutes. After centrifugation, the supernatant of the untreated mixture was turbid, while the supernatant of the treated mixture was clear. The particle size distribution of the particles contained in the supernatant of the untreated mixture was shown in FIG. 3. It is believed that the size of the particles is consistent with binders from the waste coating color.

Example 3

Figure 4:
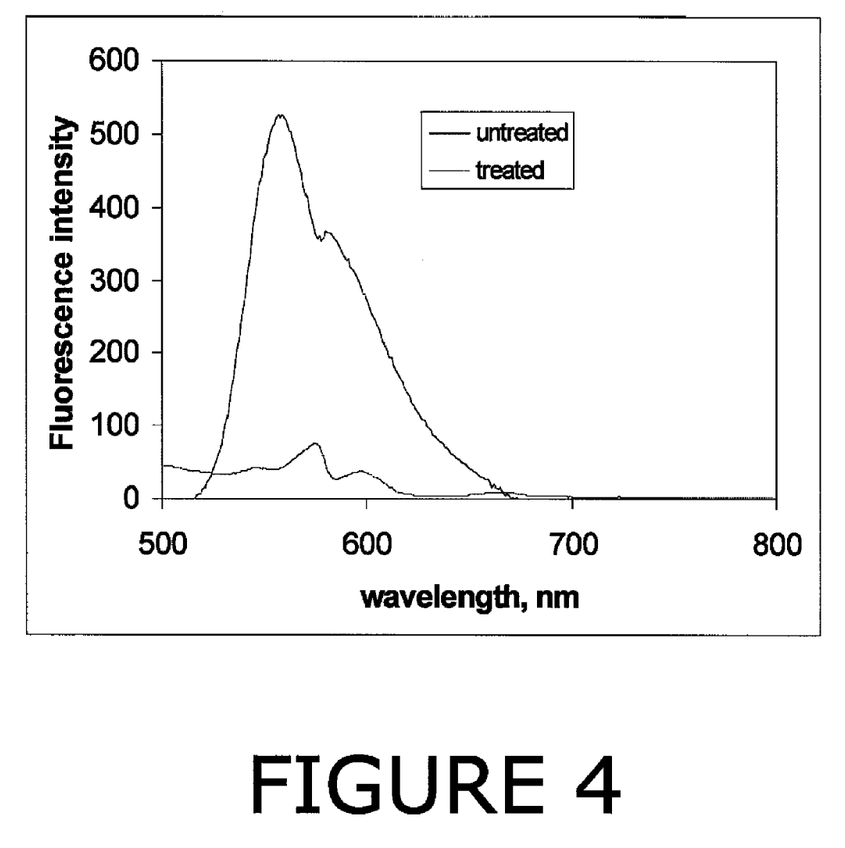
FIG. 4 is a graph showing the relative fluorescence from OBA in paper made according to the invention.

3 µl of 0.1% Nile red solution in ethanol were added into 3 ml supernatant from the centrifuged untreated mixture described in Example 2 and the fluorescence spectrum was taken. After subtracting the fluorescence from OBA (optical brightening agent) contained in the solution, there was a significant fluorescence emission, as shown in FIG. 4. The same experiment was also conducted for the supernatant of the centrifuged treated mixture described in Example 2. There was no fluorescence detectable, and the result was also shown in FIG. 4. Nile red dye emits fluorescence when it is adsorbed on a hydrophobic solid. Therefore, the result indicates that substantially all the hydrophobic materials contained in the waste coating pigment were not in the supernatant after the treatment.

Example 4

Figure 5:
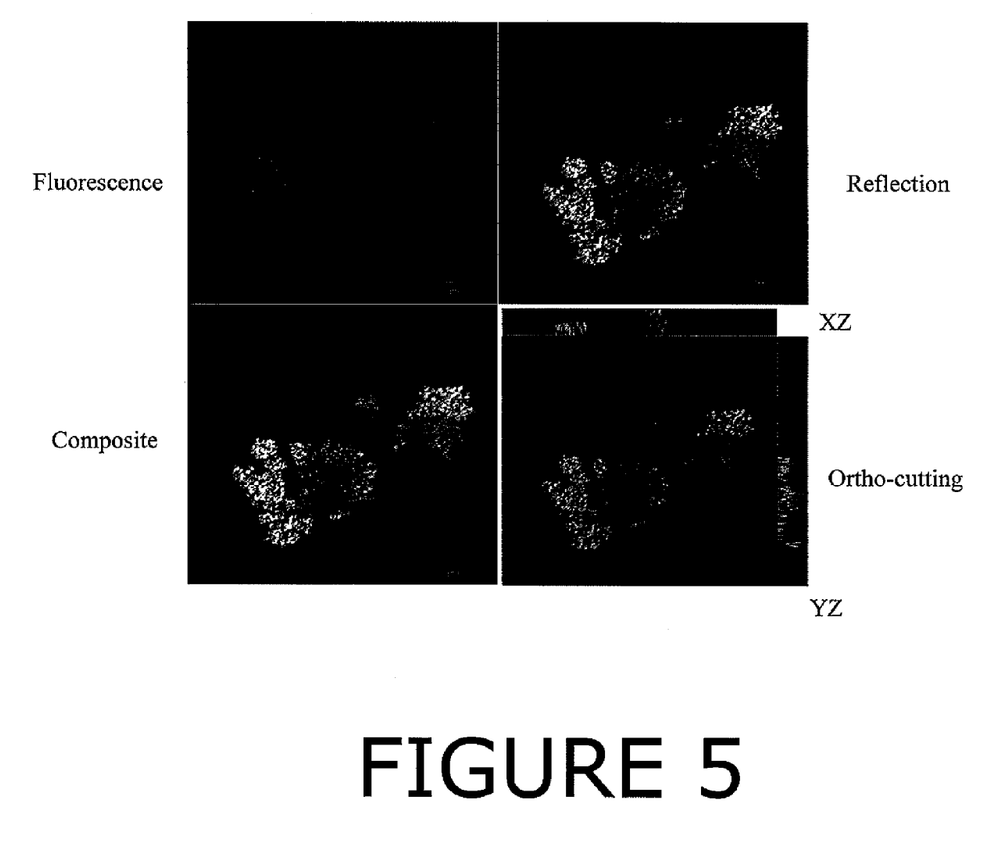
FIG. 5 is an electron micrograph of filler material used in the invention.

10 µl of 0.1% Nile red solution in ethanol were mixed with 3 ml slurry of the treated mixture described in Example 1. The fluorescence images of the particles were taken using a confocal laser scanning microscope with laser excitation at 488 nm and a 530 nm long pass filter on the emission. At the same time, a reflected light image of the same filler particles was taken. The results are shown in FIG. 5. The images clearly show that the hydrophobic binder particles were deposited on the filler surfaces.

Example 5

Figure 6:
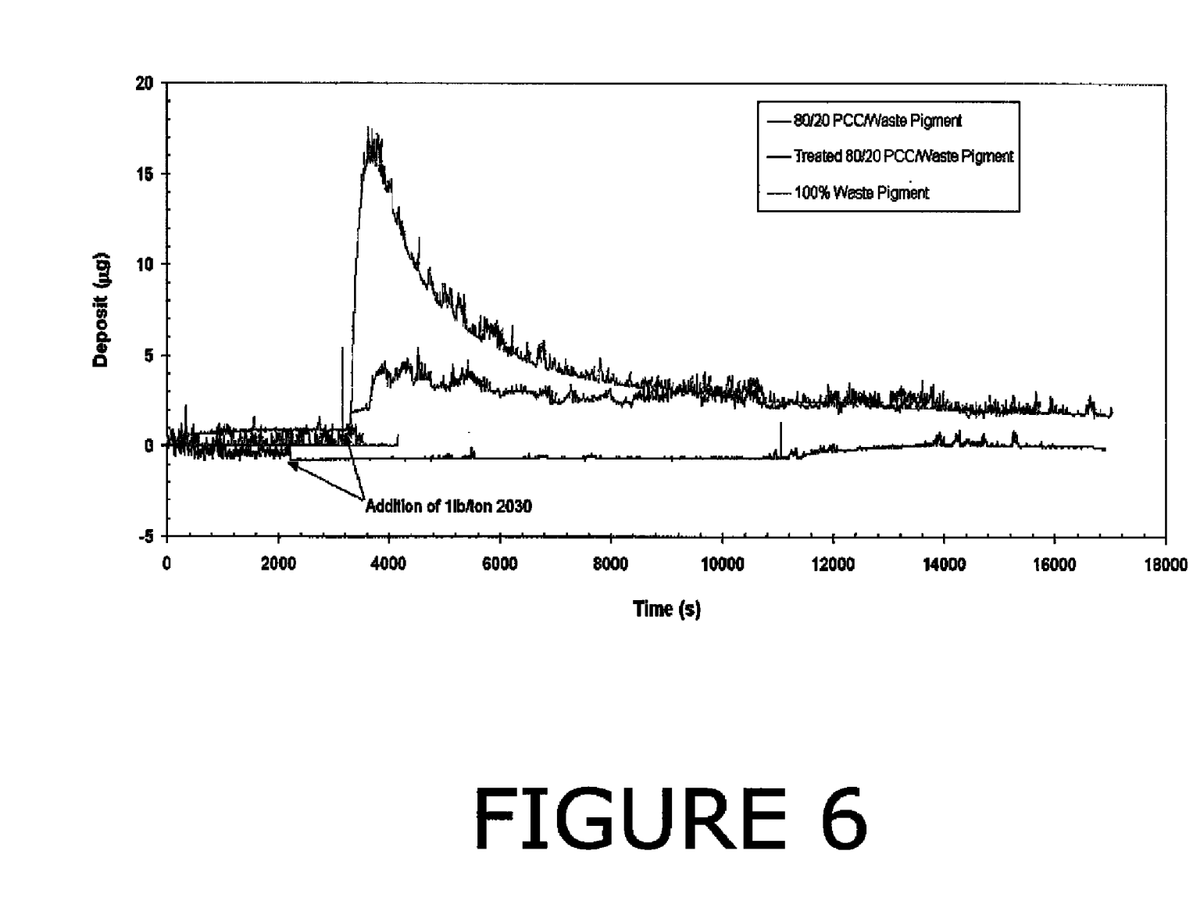
FIG. 6 is a graph showing the amount of deposit present in the invention.
Figure 7:
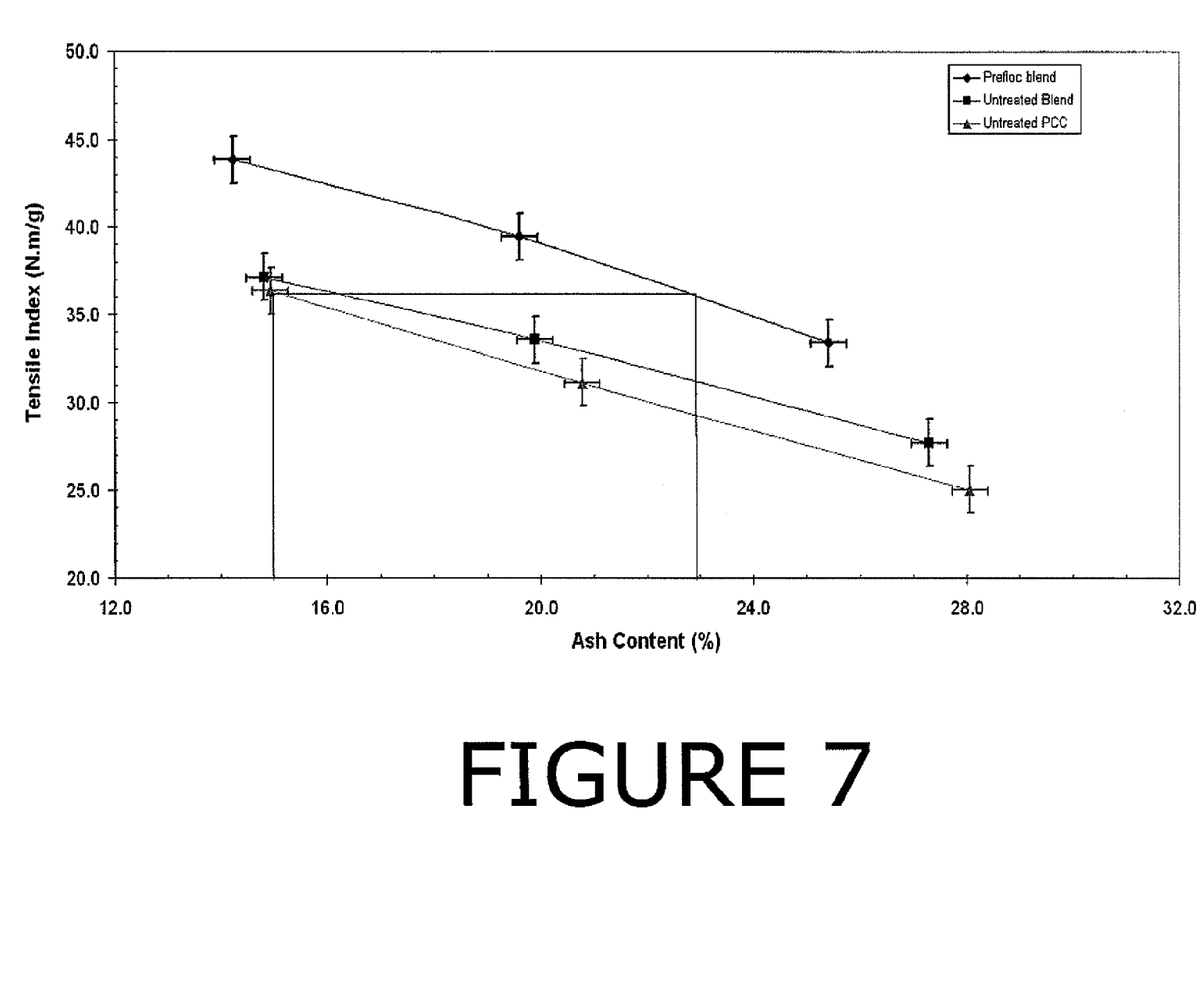
FIG. 7 is a graph showing the relative strength of paper made according to the invention.

The purpose of example 5 was to demonstrate that treated mixtures of the waste coating color and fresh filler described in Example 1 do not cause any deposits. 1400 ml of 0.6% solids cellulose fiber furnish was stirred at 300 rpm. The furnish was composed of 25% softwood and 75% hardwood. 30% by mass filler was then added to the furnish. The filler tested in the experiment was 100% waste coating color, a 20/80 mass ratio of waste coating color and fresh filler, and a treated 20/80 mass ratio of waste coating color and fresh filler. The treatment process was described in Example 1. A Nalco DRM probe was inserted into the furnish to record the amount of deposit on the probe surface. The Nalco DRM probe is a treated quartz crystal microbalance for measuring microgram quantities of deposition, as described in U.S. Pat. No. 7,842, 165. About 30 minutes later, 5 lb/ton Nalco coagulant N-2030 was added into the furnish to help neutralize the anionic charge associated with the waste coating color. (This would be done to improve retention of these components on a papermachine.) Nalco coagulant N-2030 is a cationic poly(diallyldimethylammonium chloride) with a RSV of about 0.7 dL/g, available from Nalco Company, Naperville, Ill., USA. The dosage of N-2030 was based on product mass per ton of total solids in the furnish. The results were shown in FIG. 6. After injection of 5 lb/ton N-2030 to the furnish containing 100% waste coating color, deposits were significant. For the furnish containing a 20/80 mass ratio of waste coating color and fresh filler, the deposits were less, but still significant. However, for the furnish containing the treated mixture of waste coating color and fresh filler, there was no significant amount of deposits recorded.

Example 6

The purpose of example 6 was to demonstrate the impact of the treated mixture of waste coating color and fresh filler on physical properties of handsheets. The filler and waste coating studied in this example were the same as described in Example 1: an untreated 20/80 mass ratio of waste coating color and fresh filler, a treated 20/80 mass ratio of waste coating color and fresh filler, and 100% fresh filler. The process of treating 20/80 mass ratio of waste coating color and fresh filler was described in example 1. Thick stock with a consistency of 2.5% was prepared from 75% eucalyptus hardwood dry lap pulp and 25% pine softwood dry lap pulp. Both the hardwood and softwood were refined to 400 ml Canadian Standard Freeness (TAPPI Test Method T 227 om-94) in a Valley Beater (from Voith Sulzer, Appleton, Wis.). The thick stock was diluted with tap water to 0.6% consistency. Handsheets were prepared by mixing the proper amount of 0.6% consistency furnish and fillers at 800 rpm in a Dynamic Drainage Jar with the bottom screen covered by a solid sheet of plastic to prevent drainage. The target basis weight of the handsheet was 80 gsm. Different amounts of filler were added into the furnish to change the filler content of the handsheet. The Dynamic Drainage Jar and mixer are available from Paper Chemistry Consulting Laboratory, Inc., Cannel, N.Y. 30 s after mixing, 12 lb/ton Stalok 400 starch (available from Tate and Lyle, Decatur, Ill.) and 2 lb/ton Nalsize® 7542 (available from Nalco Company, Naperville, Ill., USA) ASA emulsion were added into the furnish. The ASA emulsion was prepared in the following procedure: 28 g Nalsize® 7542 was added to 186 g of 6.0% solids Stalok 400 starch solution and 66 g deionized water to bring the total weight of solution to 280 g in a 300 ml Oster® blending cup. This mixture was agitated at high speed for 90 seconds using an Osterizer® blender. The emulsion was post-diluted with Stalok 400 starch solution to bring the mass ratio of starch to ASA to 3:1. At 45 s mixing, 1 lb/ton cationic flocculant Nalco 61067 was added. Flocculant Nalco 61067 is a cationic acrylamide-dimethylaminoethyl acrylate-methyl chloride quaternary salt copolymer with an RSV of about 25 dL/g and a charge content of 10 mole percent, available from Nalco Company, Naperville, Ill., USA. For the mixture of 20/80 waste coating color/fresh filler, 2 lb/ton Nalco coagulant 2030 (available from Nalco Company, Naperville, Ill., USA) was also added at 15 s after mixing.

Mixing was stopped at 75 seconds and the furnish was transferred into the deckle box of a handsheet mold (Adirondack Machine Company, Queensbury, N.Y.). The 8"×8" handsheet was formed by drainage through a 100 mesh forming wire. The handsheet was couched from the sheet mold wire by placing two blotters and a metal plate on the wet handsheet and roll-pressing with six passes of a 25 lb metal roller. The forming wire and top blotter were removed and the handsheet and blotter were placed on top of two new blotters. A metal plate was then placed facing the wire side of the handsheet. Five formed handsheets were stacked on top of one another in this manner (new blotter, blotter, formed handsheet, and plate) and placed in the handsheet press (Lorentzen & Wettre, Kista, Sweden) for five minutes at 0.565 MPa. The handsheet label was placed on the lower-right-wire side of the sheet and this side was in contact with the dryer surface. Sheets were dried at 220° F. for 90 seconds in a single pass using an electrically heated, rotary drum dryer (Adirondack Machine Company, Queensbury, N.Y.).

The finished handsheets were stored overnight at TAPPI standard conditions of 50% relative humidity and 23° C. The basis weight (TAPPI Test Method T 410 om-98), ash content (TAPPI Test Method T 211 om-93) for determination of PCC content, brightness (ISO Test Method 2470:1999), opacity (ISO Test Method 2471:1998), formation, tensile strength (TAPPI Test Method T 494 om-01), and z-directional tensile strength (ZDT, TAPPI Test Method T 541 om-89) of the handsheets were tested. The formation, a measure of basis weight uniformity, was determined using a Kajaani® Formation Analyzer from Metso Automation, Helsinki, FI.

Five replicate handsheets were prepared and the sheet properties were averaged and reported in Table 1. Compared to both untreated 20/80 mixture of waste coating color and fresh filler and 100% untreated PCC, the treated 20/80 mixture of waste coating color and fresh filler significantly increased sheet strength (which was also shown in FIG. 6 for tensile strength), and decreased the sheet optical properties slightly. Sheet formation was improved by the treatment of the mixture.

Changes can be made in the composition, operation, and arrangement of the method of the invention described herein without departing from the concept and scope of the invention as defined in the claims. While this invention may be embodied in many different forms, there are described in detail herein specific preferred embodiments of the invention. The present disclosure is an exemplification of the principles of the invention and is not intended to limit the invention to the particular embodiments illustrated. Furthermore, the invention encompasses any possible combination of some or all of the various embodiments described herein. All patents, patent applications, and other cited materials mentioned anywhere in this application or in any cited patent, cited patent application, or other cited material are hereby incorporated by reference in their entirety.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of incorporating waste coating in a paper sheet of a papermaking process, the method comprising:
providing: i) waste coating from a previous papermaking coating process, ii) filler particles, and iii) a furnish comprising at least cellulose fibers and water,
contacting the waste coating and the filler particles to form a mixture,
optionally adding a defoamer to the mixture,
adding a cationic agent to the mixture,
adding a first flocculating agent to the mixture in an amount sufficient to mix uniformly without causing flocculation of the filler and waste coating, the first flocculating agent being a flocculant;
adding a second flocculating agent to the mixture after adding the first flocculating agent, in an amount sufficient to initiate flocculation of the filler and waste coating in the presence of the first flocculating agent, the second flocculating agent being of opposite charge to the first flocculating agent, the flocculated mixture of fresh filler and waste coating defining a filler material,
optionally, shearing the flocculated mixture of fresh filler and waste coating to provide flocs having the desired particle size, and
adding the filler material to the furnish.

2. The method of claim 1 in which the waste coating comprises water and water is a majority of the mass of the waste coating.

3. The method of claim 1 in which the waste coating comprises at least one pigment from the list consisting of: precipitated calcium carbonate, ground calcium carbonate, kaolin clay, titanium dioxide, plastic pigments, and any combination thereof.

4. The method of claim 1 in which the waste coating comprises at least one binder from the list consisting of: starch, styrene-butadiene resin, styrene-acrylate copolymer, styrene-acrylic acid resin, and any combination thereof.

5. The method of claim 1 in which the cationic agent is one selected from the list consisting of: a starch, a flocculant, a coagulant, and any combination thereof.

6. The method of claim 1 wherein the first flocculating agent is selected from the group consisting of cationic, anionic, nonionic, zwitterionic and amphoteric polymers, the first flocculant agent being a flocculant.

7. The method of claim 1 wherein the second flocculating agent is selected from the group consisting of microparticles, coagulants, cationic polymers, anionic polymers, nonionic polymers, zwitterionic polymers, amphoteric polymers, and mixtures thereof.

8. The method of claim 7 wherein the first flocculating agent is anionic and the second flocculating agent is cationic.

9. The method of claim 1 wherein the preflocculated mixture of coating waste and fresh filler have a median particle size of 10-70 μm.

10. The method of claim 1 in which substantially 100% of the coating pigments and binders are flocculated with the filler material.

11. The method of claim 2 in which the solids content of the waste coating is between 0.5% and 10%.

12. The method of claim 1 in which relative amounts of filler particles and coating particles are between 50 to 98% filler particles and 2% to 50% waste coating particles.

* * * * *